United States Patent [19]

Baechtiger et al.

[11] Patent Number: 4,905,010
[45] Date of Patent: Feb. 27, 1990

[54] METHOD FOR BALANCING CHANNELS IN A MULTICHANNEL PULSE RADAR SYSTEM AND A RADAR SYSTEM USING THIS METHOD

[75] Inventors: Rolf Baechtiger, Oberwil-Lieli; Pierino Pacozzi; Albert Schenkel, both of Zurich, all of Switzerland

[73] Assignee: Siemens-Albis Aktiengesellschaft, Zurich, Switzerland

[21] Appl. No.: 338,929

[22] Filed: Apr. 14, 1989

[30] Foreign Application Priority Data

Jan. 31, 1989 [CH] Switzerland ............... 00314/89

[51] Int. Cl.$^4$ .............................................. G01S 13/44
[52] U.S. Cl. ...................................... 342/151; 342/152
[58] Field of Search ............... 342/131, 129, 151, 152

[56] References Cited

U.S. PATENT DOCUMENTS 3,471,020 7/1975 Howard .
4,219,816 8/1980 Schenkel et al. ............... 343/16 M
4,356,440 10/1982 Bray et al. .
4,794,998 7/1974 Pearson, Jr. et al. .

FOREIGN PATENT DOCUMENTS 592887 11/1977 Switzerland .
629898 5/1982 Switzerland .

Primary Examiner—Thomas H. Tarcza
Assistant Examiner—Mark Hellner
Attorney, Agent, or Firm—Lawrence C. Edelman

[57] ABSTRACT

Radar systems that operate in accordance with the crossfeed method require an exact balancing of the individual Doppler frequency evaluation channels in the receiver. According to the invention, a special method is used first to make the amplitude levels in the individual channels equal to one another and then to determine and balance the phase differences between the channels. A radar system using this method is also described.

7 Claims, 2 Drawing Sheets

METHOD FOR BALANCING CHANNELS IN A MULTICHANNEL PULSE RADAR SYSTEM AND A RADAR SYSTEM USING THIS METHOD

BACKGROUND OF THE INVENTION

1. Field of the Invention

The invention concerns a method for balancing individual channels of a pulse radar system having multi-channel signal evaluation and a radar system using this method.

2. Description of the Prior Art

Radar systems of the above kind are used primarily for tracking. For this purpose, squint signals are generated for azimuth and elevation, which are reduced to zero in free space when the target axis of the antenna is aimed exactly at the target. The subsequent guiding of the antenna for tracking is accomplished by two servo circuits, one for setting the elevation and one for setting the azimuth. Radar systems of this kind are generally known.

If targets are tracked with a radar system of this kind in an area in which, for example, the echo signals are reflected on a water surface in the direction of the antenna, an elevation squint signal occurs, which will not become zero even when the target axis of the antenna is aimed exactly at the target. The result of this water reflection squint signal is that the elevation servo circuit guides the target axis of the antenna away from the target during the subsequent tracking phase of its operation.

To cope with this difficulty, therefore, in the so-called cross-feed method, additional squint signals are used, which, when the combination is right, produce a zero reading on the target axis even when there is reflection. This method is described extensively in Swiss patents Nos. 592,887 and 629,898, incorporated herein by reference. This method requires a so-called cross-channel in the radar device, and in both the elevation and cross-channel signals, there are generated squint components which have both in-phase and quadrature elements. The quadrature elements only occur if, as the result of reflections, the reception signal consists of two echo elements, namely the direct echo and the reflected echo. In this case the phase relation between the two signal components can be arbitrary and is determined by the instantaneous geometric configuration of the overall position. In order to be able to eliminate the effect of the reflected echo, however, the amplitude and the phase of the elevation and cross signals, as well as the sum signal that is required for the signal processing, must be transmitted error-free through the antenna and the reception channels to the Doppler evaluation circuit of the radar device. Deviations from these conditions would result in false squint components, which can make the use of the crossfeed method a questionable procedure.

Therefore, to avoid asymmetries of magnitude and phase in the reception channels, calibrations are made at regular time intervals, both when a radar device of this kind is initially turned on and when it is in stand-by operation. Errors resulting from deviations of the antenna from its ideal form can be detected on the antenna test position and retained in the radar device as correction values, which are then taken into account when the squint signals are processed. During the calibration, a test signal is entered either in the antenna or in its radio frequency feed lines.

SUMMARY OF THE INVENTION

According to the present invention, the balancing or calibration process for each one of n channels of a pulse radar system of the kind described in the introduction is accomplished in the following manner: The IF-output signal of each channel is multiplied with a signal emitted by a reference oscillator of the radar system which serves as a reference phase signal. This is done both with the signal derived from the reference phase signal and with a derived signal that has undergone a 90° phase shift with respect to the first one. 2n multiplication signals are formed in this manner and are subjected to an amplitude comparison with reference to a sum signal formed from the multiplication signals with the individual channel signals being regulated in a feedback manner to the same amplitude value by means of amplitude correction signals obtained from the comparison. Finally, the individual channel signals that have been regulated with regard to amplitude are compared with regard to phase to the sum signal and the resulting phase correction signals are used to control the phases of the individual channels for phase equality with respect to the sum signal in the Doppler evaluation part of the radar device.

In the preferred embodiment it is advantageous if the sum signal and the individual difference signals are initially multiplied over a first path (in-phase channels) by a reference phase signal and over a second parallel path (quadrature channels) with a reference phase signal that has been shifted by 90° in each case. Next, the signal components that occur in the quadrature channels during this process are regulated to zero and the amplitude values occurring in the in-phase channels are stored. Then, the reference phase signal for the in-phase signals of the difference channels is set at 90° and for the quadrature signals at 180° and the amplitude value of the signals occurring in the quadrature channels is compared with the signal amplitude of the in-phase channels that were originally determined.

Other features and advantages of the invention will be apparent from the description of the preferred embodiment, and from the claims.

For a fuller understanding of the present invention, reference should now be made to the following detailed description of the preferred embodiment of the invention and to the accompanying drawings.

DETAILED DESCRIPTION OF THE PREFERRED EMBODIMENTS

Figure 1:
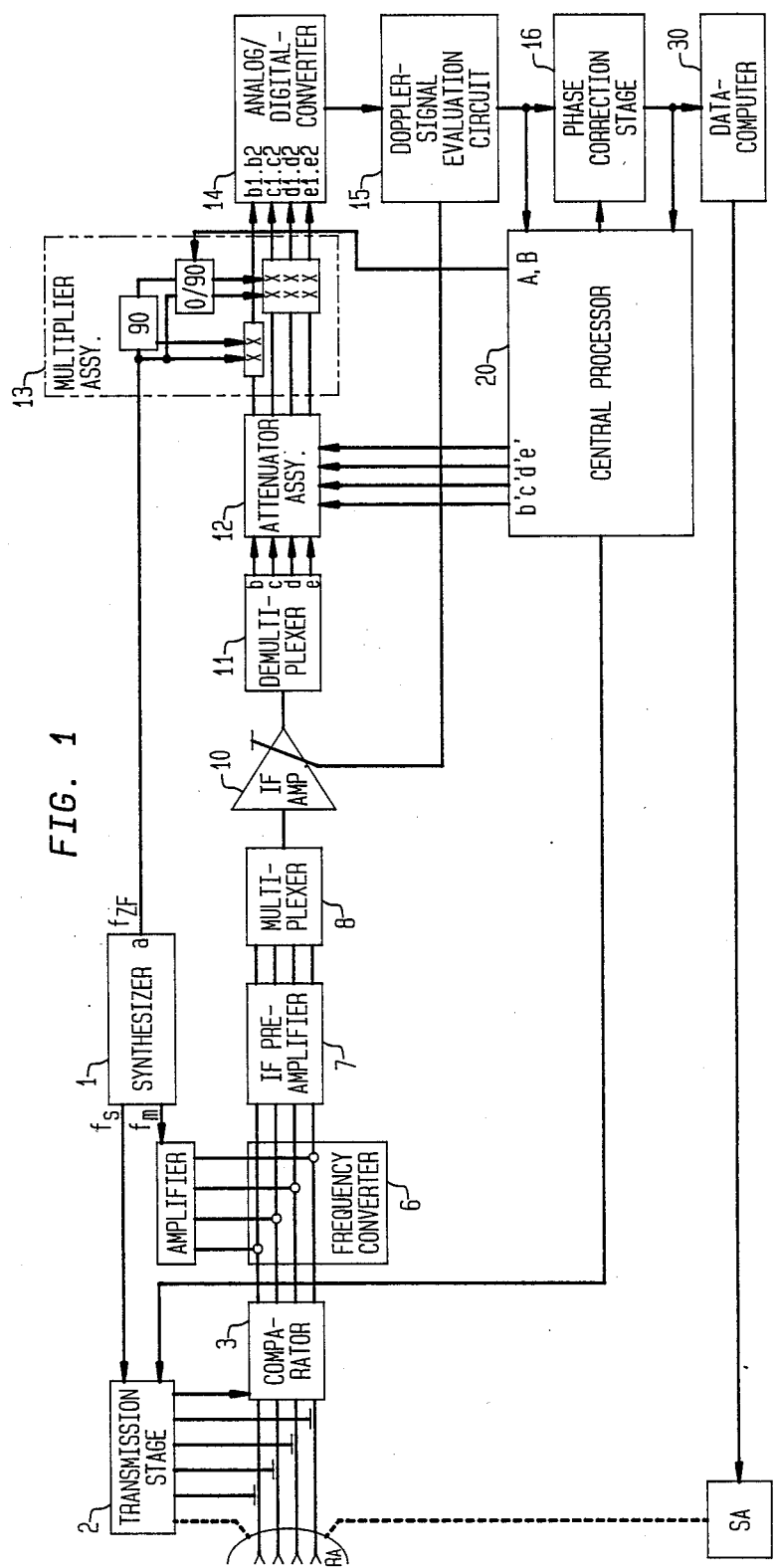
FIG. 1 illustrates a general circuit diagram for a radar system that operates in accordance with the method of the invention.

In FIG. 1 a directional antenna RA having a concave subreflector and at whose phase center are mounted four primary radiators, constitutes the transmission and reception antenna of the radar system. In the case of transmission, a transmission stage 2 feeds the four primary radiators, which then emit electromagnetic waves over the subreflector and the main reflector in the direction of a target that is to be tracked. This emission is made in pulse form and at regular time intervals, with the so-called pulse repetition frequency. During reception, the echo pulses of the target are received over antenna system RA and fed to a comparator 3 in a manner that is known per se. Transmission stage 2 is driven by a frequency synthesizer 1 that is controlled by a reference oscillator included therein. Synthesizer 1 emits both a direct transmission frequency $f_s$ to transmission stage 2 as a signal and a frequency $f_M$ (frequency-shifted with respect to the former) as a signal to a frequency converter 6. From converter 6, the signals are fed to a stage 7, where an intermediate pre-amplification takes place.

In comparator 3, four signals are derived in a manner that is known per se from the echo signals received by the primary radiator. These four signals are fed over separate channels to frequency converter 6. They are, in a manner that is known per se, the so-called sum signal, the azimuth signal, the elevation signal and the cross signal. A detailed description of these signals and their derivation will not be given here, since this is known from, for example, the publication "Crossfeed Monopulse—A Specific Method to Eliminate Mistracking over Sea," which was distributed as a paper at the "Radar-87" conference, London, Oct. 19-21, 1987 of the IEE and incorporated herein by reference. Each of the frequency converters of converter stage 6 is connected to its own channel-specific intermediate frequency preamplifier 7. The output signals of preamplifiers 7 are fed to a multiplexer 8, which converts the signals of the four channels received in parallel at its input into series form. The amplitude of these signals is raised to a sufficient extent by an intermediate frequency amplifier 10, which is used jointly for them and can be regulated with respect to its gain.

Next, the signals are fed to a demultiplexer 11, which brings them back into parallel form with respect to one another. The sum signal is applied to output b, the azimuth signal to output c, the elevation signal to output d, and the cross signal to output e, forming four (n) channels. A channel-specific attenuating element is connected to each of these four channels and controlled by regulating signals a', b', c' and d'. Next, it is essential that an assembly of multipliers 13 be provided. For a clearer understanding, details of multiplier assembly 13 are shown separately in FIG. 2. For the multiplication, multipliers 13 receive an additional signal having a frequency $f_{ZF}$, which corresponds to the difference between the transmission signal frequency $f_s$ and the mixer frequency $f_M$ over the line a. With this signal multipliers 13 transpose the individual signals b, c, d and e located in the intermediate frequency band to a baseband position. Thus, multipliers 13 act as demodulators. The output signals of assembly 13 are, due to this design, fundamentally the signals b, c, d and e, but now having both a reference phase position and a quadrature position. Each of multipliers 13 thus basically has two outputs, namely one for the in-phase signal and one for the quadrature phase signal. These outputs are designated b1 and b2 for the sum channel, c1 and c2 for the azimuth channel, d1 and d2 for the elevation channel and e1 and e2 for the cross channel. These signals are fed through a sampling/holding circuit to an analog-to-digital converter 14. Analog-to-digital converter 14 provides these eight signals in serial form to a Doppler signal evaluation assembly 15 in a manner that is known per se.

Figure 2:
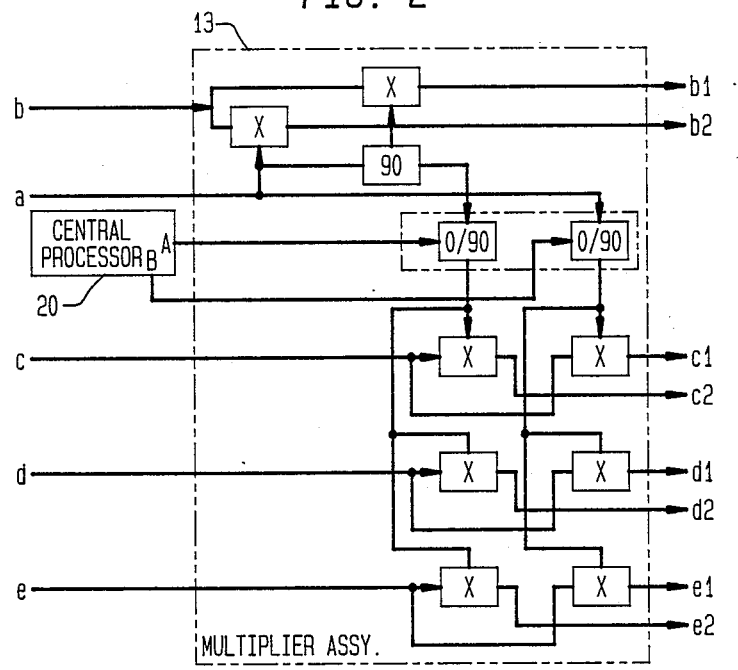
FIG. 2 illustrates details of the multiplexer assembly of FIG. 1.

Multiplier assembly 13 shown in FIG. 2, has the same terminal and output designations as shown in FIG. 1. Two multipliers are fed in parallel with sum signal b. The first of these two multipliers, however, receives the signal directly from terminal a, while this signal is fed to the second multiplier via a 90° phase shift circuit. As a result, a so-called in-phase signal is available at output b1 and a quadrature signal, located for this purpose in the quadrature, at output b2. For the so-called difference signal stages which are connected to signal channels c, d and e, a similar procedure takes place, that is, signal c is fed to two multipliers and so are signals d and e. It is essential that the transmission of the reference phase signal for the three groups of multipliers take place via phase rotation elements A and B, which apply a phase shift between 0° and 90° in response to control signals from a central processor 20, to be described next.

In evaluation circuit 15, there is performed a Doppler evaluation, which, in a manner that is known per se, distinguishes moving targets from fixed targets and permits only the former to be further evaluated. In evaluation circuit 15, a control signal for intermediate frequency amplifier 10 is derived from these filtered signals, by taking the geometric average of the in-phase signals and the quadrature signals. In addition, evaluation circuit 15 feeds a phase correction stage 16, as well as a central processor 20, which, for the sake of clear understanding, is shown in greater detail in FIG. 3.

Figure 3:
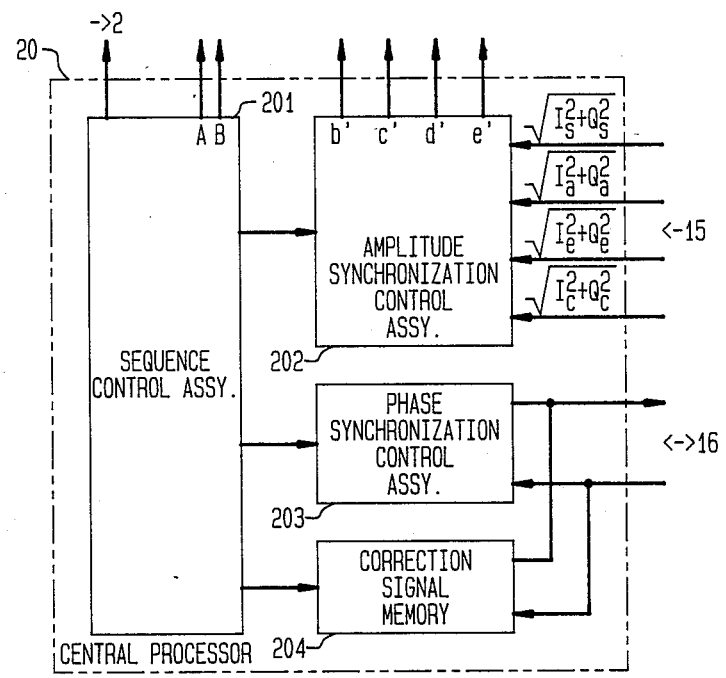
FIG. 3 illustrates details of the central processor of FIG. 1.

Central processor 20 emits a control signal to transmission stage 2. There the signal feeds a test pulse into the antenna feed lines, or, as shown by the broken line, into antenna RA, provided that the radar system is not emitting a pulse used for tracking purposes—that is, in the reception and transmission-free periods between radar pulses or in a stand-by time. As a result, central processor 20 is to this extent a sequence control. As shown in FIG. 3, from evaluation circuit 15 the geometric average signals developed in FIG. 2 are fed to an amplitude synchronization control assembly 202, where $I_S$ and $Q_S$, respectively, represent the in-phase (I) and quadrature (Q) components of the sum channel, $I_a$ and $Q_a$ represent the azimuth components, $I_e$ and $Q_e$ the elevation components, and $I_c$ and $Q_c$ the cross components. In amplitude synchronization control 202, these components are compared quantitatively with one another, and, based on the geometric averages of $I_s$ and $Q_s$, $I_a$ and $Q_a$, $I_e$ and $Q_e$, and $I_c$ and $Q_c$, correcting variables b', c', d' and e' are derived for the attenuators in assembly 12 in such a manner that the absolute values of the signals at the attenuator outputs of the four channels will be equal to one another. The circuit elements required for this purpose in 202 are simple level comparators, whose output voltages are used as correcting variables for the attenuators of assembly 12. For this balancing process, a sequence control 201 switches phase rotation elements A and B to provide a phase shift angle of 0°. The first step in this process is to balance the signal levels in the individual channels. If they are perfectly balanced, the signals in the quadrature channels, which are designated by Q, disappear.

Next, to arrive at a balance of the phase differences in the channels, the different phases of the output respect to a test signal. For this purpose, the phase rotation elements A and B in FIG. 2 are switched by sequence control 201 to provide a phase shift angle of 0°. The result of this is that for an exact balancing, the signals in the quadrature channels must be reduced to zero, and those in the in-phase channels must reach their maximum value. This is accomplished with a phase synchronization control circuit 203.

The output signals of Doppler evaluation circuit 15 are fed for phase correction to a correction stage 16, which contains phase correction elements. Due to the switching of phase rotation elements A and B in this way that the phase shift angle is 90°; the signal amplitudes of the quadrature values must now reach their maximum. The signal level of the quadrature channels should now be at the same level as the in-phase channels when there was no phase rotation. In a radar system designed in accordance with the invention, the necessary correction signals are stored in a memory in 204 for each of the individual channels.

When a radar system that has been precalibrated in this manner is in operation and a target is sighted, the correction of the phase position in the equipment that has been thus balanced and provided with correction values is accomplished by taking the correction values stored in memory 204 and added, through 203, to the echo signal evaluated in the individual channels, so that an exact signal for a target data computer 30, which activates servo drives SA for the azimuth and elevation setting, is ultimately received at the output of phase correction stage 16.

Radar systems of the kind described here are generally designed to include a number of operating frequencies. For this purpose, the control frequency of transmitter 2, which is supplied by synthesizer 1, is made adjustable in its value. Naturally, as a result of the electrical transmission characteristics in the microwave section of the radar system, individual channels differ to a certain extent for the different transmission frequencies. If the balancing and calibration process described in the invention is performed for each of these operating frequencies and the corresponding correction values are stored in the correction memory 204, then sequence control 201 will, ensure that when the transmission frequency is switched, a set of correction signals which has been computed and found to be suitable for this transmission frequency is fed to phase and amplitude correction circuit 16 from the correction signal memory 204.

A detailed description of the sequence control is given below.

201 (sequence instruction)

Receives the sequence instruction for the radar control; in particular, the calibration process is controlled by it.

202 (amplitude synchronization control)

In the first calibration step, control 202 brings the analog components of all 4 reception channels to the same amplification. For this purpose two azimuth and elevation calibration signals are fed in alternately, and the three difference channel amplifications are adjusted to the value of the sum signal.

203 (phase synchronization control)

In the second calibration step the phase position of the 3 difference channels is adjusted to the same value as the sum signal, with the aid of the two calibration signals.

204 (memory calibration of the in-phase and quadrature channels, antenna corrections)

In the third calibration step, an amplitude calibration to a defined absolute value is performed. This is necessary for the following reasons: In the course of feeding in the selected calibration, a defined squint entry should be generated. If, due to manufacturing tolerances, this does not occur, 204 generates a correction value, which is fed into 16. Then, two phase shifters A and B of assembly 13 which shift the demodulated signal by 90°, are switched under the control of 201. Now the in-phase signals at the output of assembly 16 should be 0°, but the output signals of the quadrature channels should have the same amplitude that was measured for the signals of the in-phase channels without a phase shift. If this is not the case, a factor that produces this effect is entered by 204 in assembly 16. In a fourth step, correction values which were obtained on the antenna test position are fed into assembly 16. They are dependent on exemplary controls.

Description of a calibration (a) amplitude synchronization of the received analog components 201 to assembly 2: feeds the calibration signal into the azimuth channel.

201 to assembly 15: computes the amplitude values of the sum signal and the azimuth signal $U(sum) = (I_s^2 + Q_s^2)^{\frac{1}{2}}$ $U(azimuth) = (I_a^2 + Q_a^2)^{\frac{1}{2}}$ 202: compares the values. If $U_1$ (azimuth) is not equal to $U_s$(sum), 202 computes a correction value and sends it to assembly 12.

Assembly 12: changes the attenuation.

201 to assembly 15: computes the amplitude values of the sum signal and azimuth signal $U_s(sum) = (I_s^2 + Q_s^2)^{\frac{1}{2}}$ $U_a(azimuth) = (I_a^2 + Q_a^2)^{\frac{1}{2}}$ 202: compares the values. If U (azimuth) is not equal to U (sum), 202 computes a correction value and sends it to assembly 12.

Assembly 12: changes the attenuation. If U (sum) = U (azimuth) the correction is discontinued.

201 to assembly 2: turn offs calibration signal in the azimuth. Feed calibration signal into the elevation.

Assembly 15: computes the amplitude values of the sum signal, elevation signal and cross signal.

$U(sum) = (I_s^2 + Q_s^2)^{\frac{1}{2}}$ $U(azimuth) = (I_a^2 + Q_a^2)^{\frac{1}{2}}$ $U(cross) = (I_c^2 + Q_c^2)^{\frac{1}{2}}$ 202: compares the values. If $U_e$ (elevation) and/or $U_c$ (cross) are/is not equal to $U_s$ (sum), 202 computes correction values and sends them to assembly 16.

Note: Depending on the way in which the calibration signals are fed into the antenna or its feed lines, the various channels may have different levels. In this case, corresponding correction factors must be put into 202.

(b) phase synchronization of the channels 201 to assembly 2: feeds a calibration signal into the azimuth channel.

201 to 203: checks at the output of assembly 16 whether the signal of the azimuth quadrature channel is zero. If not, computes a complex phase shift and sends correction values to assembly 16. Now the quadrature phase channel must be zero.

(c) calibration of the correction factor values 201 to assembly 2: feeds a calibration signal into the azimuth channel.

204: measures the azimuth-in-phase amplitude. It should have a defined value. If not, 204 computes a correction factor and sends it to assembly 16.

201 and assembly 2: turns off the calibration signal in the azimuth channel. Feeds the calibration signal into the elevation channel.

204: measures the elevation- and cross-in-phase amplitude. They should have defined values. If not, 204 computes correction factors and sends them to assembly 16.

201 to assembly 13: uses A and B to shift the phases for the difference channels by 90 degrees each.

201 to assembly 2: feeds the calibration signal into the azimuth channel.

204: measures the azimuth-quadrature channel signal amplitudes. It should have the same value as the in-phase channel signals without phase shifting in assembly 13. If not, 204 computes a correction factor and sends it to assembly 16.

201 to assembly 2: turns off the calibration signal in the azimuth channel. Feeds the calibration signal into the elevation channel.

(d) antenna corrections

On the antenna measuring position there can be computed any corrections required to take into account the manufacturing tolerances. These corrections are stored in memory 204 and are sent to assembly 16. Here each signal that is transmitted to the tracking computer 30 is corrected with these values for the frequency that is then in use.

Thus, there has been shown and described a novel method and apparatus for balancing the channels of a multichannel pulse radar device which fulfills all the objects and advantages sought therefore. Many changes, modifications, variations and other uses and applications of the subject invention, will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. A method for balancing n individual channels of a pulse radar system having multichannel signal evaluation, in which there is provided for the emission of the radar pulses and the reception of the echo signals a common antenna having a plurality of primary radiators corresponding to the number n of channel and in which a test signal is fed into the antenna or the feed lines of the primary radiators, wherein:

the IF-output signal of each channel is directly multiplied by a phase reference signal derived from a transmission oscillator of the radar system and also multiplied with a derived signal whose phase has been shifted by 90° with respect to said reference signal, so as to form 2n multiplication signals;

the 2n multiplication signals thus formed are subjected to an amplitude comparison with respect to a sum signal formed from the multiplication signals for developing amplitude correction signals, and by means of the resulting amplitude correction signals, the individual channel signals are regulated in a feedback type manner to the same amplitude value; and the individual channel signals whose amplitudes have been so adjusted are then compared to the sum signal with respect to their phase and phase correction signals resulting from such comparison are used to adjust the phases of the individual channels to make them equal with respect to the phase of the sum signal.

2. The method according to claim 1, wherein:

the sum signal and individual difference signals resulting from the above-mentioned multiplication are first multiplied over a first path (in-phase channels) with a reference phase signal and then over a second parallel path (quadrature channels) with reference phase signals which have each undergone a 90° phase shift;

the signal components that thus occur in the quadrature channels are adjusted to zero and the amplitude values occurring in the in-phase channels are stored;

the reference phase signal for the in-phase signals of the difference channel are set at 90° and for the quadrature signals are set at 180°; and The amplitude value of the signals occurring in the quadrature channels are made equal to the signal amplitudes that were initially determined for the in-phase channels.

3. A four-channel pulse radar system of the type including a frequency converter at the radio frequency outputs of each of the individual channels for transposing the radio frequency signals of the individual channels into intermediate frequency signals which are then fed to a common, adjustable gain intermediate frequency amplifier, wherein:

an adjustable amplitude regulator for each of the channels is coupled at the output of the common intermediate frequency amplifier, at whose outputs there are connected two multipliers which serve as intermediate frequency demodulators;

of two multipliers in a first (integrating) channel of said four channels, one is coupled to directly receive a frequency conversion signal derived from a transmission oscillator of the radar system, while the other is coupled to receive the frequency conversion signal through a 90° phase rotation element;

in each of the remaining (difference) channels, one multiplier is coupled to receive said frequency conversion signal through a phase rotation element which is adjustable between 0° and 90°, and a second multiplier is coupled to receive said frequency conversion signal through a phase rotation element which is adjustable between 90° and 180°;

the outputs of each of the above-mentioned individual multipliers are coupled with an analog/digital converter via a sampling/holding circuit and then to a Doppler frequency evaluation circuit;

the output of the Doppler frequency evaluation circuit is coupled to a stage in which there is formed by multiplication from in phase signals and quadrature signals a sum signal which serves to provide amplitude correction by regulating the gain of said common intermediate frequency amplifier and which stage, in addition, contains a circuit for deriving a control voltage for the individual adjustable amplitude regulators of each channel, which circuit compares the channel signals with the sum signal to form amplitude correction signals;

a phase correction circuit coupled to the output of the Doppler frequency evaluation circuit which provides phase correction of the individual channels at the output of the Doppler frequency evaluation circuit with respect to the phase of the sum signal; and a conversion device is provided which, for the zero-balancing of the in-phase signals of the other channels, sets the phase rotation elements to 0° and 90° respectively, and, for the zero-balancing of the quadrature signals, sets the phase rotation elements of the other channels to 90° or 180°, respectively.

4. A radar system according to claim 3, wherein:

a memory circuit is provided in which correction values for the amplitude correction and/or the phase correction are stored and that in the receiving section of the radar system which precedes the Doppler frequency evaluation circuit there is introduced a correction circuit for the sum channel and the difference channels, which, when the system is operating, corrects the signals resulting from the echo signals by means of the stored correction values.

5. The method of claim 1, wherein said radar system can operate on a plurality of radio frequencies;

phase and amplitude correction signals are developed for each one of said plurality of radio frequencies and fed into a memory and stored; and in combination with a frequency conversion occurring in the radar system, there is provided a corresponding conversion of the correction signals which are read-out of the memory.

6. A radar system according to claim 3 which can operate on a plurality of radio frequencies, wherein:

correction values are provided for each one of said plurality of radio frequencies and are fed into a memory and stored and, with a frequency conversion occurring in the radar system, there is provided a corresponding conversion of the correction values which are read-out of the memory.

7. A radar system according to claim 4 which can operate on a plurality of radio frequencies, wherein:

correction values are provided for each one of said plurality of radio frequencies and are fed into a memory and stored and, with a frequency conversion occurring in the radar system, there is provided a corresponding conversion of the correction values which are read-out of the memory.

* * * * *

UNITED STATES PATENT AND TRADEMARK OFFICE
CERTIFICATE OF CORRECTION

PATENT NO. : 4,905,010

DATED : February 27, 1990

INVENTOR(S) : Baechtiger et al.

It is certified that error appears in the above-identified patent and that said Letters Patent is hereby corrected as shown below:

Cover Page
Section (30) following "00314/89" insert
--Apr. 6, 1989 (CH) Switzerland ............ 01 289/89-2--.

Signed and Sealed this

Twenty-fifth Day of June, 1991

Attest:

HARRY F. MANBECK, JR.

*Attesting Officer*

Commissioner of Patents and Trademarks